United States Patent
Toon

(10) Patent No.: US 8,285,324 B2
(45) Date of Patent: Oct. 9, 2012

(54) SMART CARD MODULE SUPPORTING AUTHENTICATION AND SOFTWARE-DEFINED RADIO FUNCTION FOR A WIRELESS DEVICE

(75) Inventor: Nigel Toon, Aztec (GB)

(73) Assignee: ICERA Inc., Wilmington, DE (US)

( * ) Notice: Subject to any disclaimer, the term of this patent is extended or adjusted under 35 U.S.C. 154(b) by 64 days.

(21) Appl. No.: 12/668,404

(22) PCT Filed: Jul. 11, 2008

(86) PCT No.: PCT/EP2008/059116
§ 371 (c)(1),
(2), (4) Date: Jun. 16, 2010

(87) PCT Pub. No.: WO2009/007455
PCT Pub. Date: Jan. 15, 2009

(65) Prior Publication Data
US 2010/0267418 A1    Oct. 21, 2010

(30) Foreign Application Priority Data
Jul. 12, 2007  (GB) .................................. 0713614.6

(51) Int. Cl.
*H04M 1/00* (2006.01)
*H04B 1/38* (2006.01)

(52) U.S. Cl. ............... 455/550.1; 455/552.1; 455/553.1; 455/556.1; 455/558

(58) Field of Classification Search ............... 455/550.1, 455/552.1, 553.1, 556.1, 558
See application file for complete search history.

(56) References Cited

U.S. PATENT DOCUMENTS

| | | | | |
|---|---|---|---|---|
| 5,367,434 A | * | 11/1994 | Griffin et al. | ................. 361/719 |
| 2003/0100340 A1 | * | 5/2003 | Cupps et al. | .................. 455/556 |
| 2004/0235522 A1 | | 11/2004 | Lin | |
| 2007/0275759 A1 | * | 11/2007 | Kemppinen | ................... 455/558 |
| 2008/0064442 A1 | * | 3/2008 | Boltwood et al. | ............. 455/558 |
| 2008/0146280 A1 | * | 6/2008 | Sasse et al. | .................... 455/558 |
| 2008/0182621 A1 | * | 7/2008 | Morman | ....................... 455/558 |
| 2009/0093272 A1 | * | 4/2009 | Saarisalo et al. | .............. 455/558 |

FOREIGN PATENT DOCUMENTS

| | | |
|---|---|---|
| EP | 1515448 A1 | 3/2005 |
| EP | 1523150 A1 | 4/2005 |
| WO | 03075588 A1 | 9/2003 |
| WO | 2006100669 A2 | 9/2006 |
| WO | 2009007455 A1 | 1/2009 |

OTHER PUBLICATIONS http:/en.wikipeida.org/w/index.php?title=W-SIM&oldid=127963741; Oct. 30, 2009; W-SIM—Wikipedia, the free encyclopedia; 2 pages.
http://investorrelaitons.utstarcom/releasedetail.cfm?ReleaseID=187332&iphl=modul...; Oct. 13, 2009; UTStarcom, Inc.—UTStarcom Demos World's First Plug-In Cellular Phone Module at...; 2 pages.
PCT/EP2008/059116; International Search Report; Oct. 28, 2008.

* cited by examiner

*Primary Examiner* — Wen Huang

(57) ABSTRACT

The disclosure provides a module for use in a wireless electronic device and being removable therefrom. In one embodiment, the module includes an antenna connector for connecting the antenna of the wireless terminal to the module, and transferring radio frequency signals over a wireless interface. The module also includes a first storage means storing user authentication information for use in authenticating a user of the wireless terminal to a wireless cellular network, and a second storage means storing communications code for processing information to be transferred over the wireless interface. The module further includes a processor arranged to execute the communications code in order to process information for communicating between the wireless terminal and the cellular network via the antenna connector.

22 Claims, 3 Drawing Sheets

SMART CARD MODULE SUPPORTING AUTHENTICATION AND SOFTWARE-DEFINED RADIO FUNCTION FOR A WIRELESS DEVICE

CROSS-REFERENCE TO RELATED APPLICATION

This application is the National Stage of, and therefore claims the benefit of, International Application No. PCT/EP2008/059116 filed on Jul. 11, 2008, entitled "SMART CARD MODULE," which was published in English under International Publication Number WO 2009/007455 on Jan. 15, 2009, under the title "SMART CARD MODULE SUPPORTING AUTHENTICATION AND SOFTWARE-DEFINED RADIO FUNCTION FOR A WIRELESS DEVICE" and has a priority date of Jul. 12, 2007, based on the application GB 2007/0013614. Both of the above applications are commonly assigned with this National Stage application and are incorporated herein by reference in their entirety.

TECHNICAL FIELD

This application is directed, in general, to a removable module for a wireless device, and particularly but not exclusively to a cellular wireless wide area networking modem module.

BACKGROUND

A UICC (Universal Integrated Circuit Card) is a smartcard with an embedded processor and storage which securely stores the cellular subscriber information and authentication information and which runs an application to identify the subscriber to the cellular network. The UICC supports a number of applications including a GSM 11.11 Subscriber Identity Module—Mobile Equipment (SIM-ME) application to allow connection to a 2G GSM cellular network and a 3GPP TS 31.102 Universal Subscriber Identity Module (USIM) application to allow connection to a 3G UMTS cellular network. In addition the UICC supports the GSM 11.14 SIM Application Toolkit for the Subscriber Identity Module—Mobile Equipment and is also capable of supporting the 3GPP TS 31.103 IP Multimedia Services Identification Module (ISIM) application to allow identification and authentication to the 3GPP Release 5 IP Multimedia Subsystem (IMS) and to support the Session Initiation Protocol (SIP). The UICC card is specific to the GSM and UMTS 3GPP cellular networks, but other types of SIM card are also in use for other types of cellular network.

Details of such UICC cards and other SIM cards, and the relevant authentication and encryption procedures, will be familiar to a person skilled in the art.

SUMMARY

According to one aspect, there is provided a module for use in a wireless electronic device and being removable therefrom. In one embodiment, the module includes: (1) an antenna connector for connecting the antenna of the wireless terminal to the module and transferring radio frequency signals over a wireless interface, (2) a first storage means storing user authentication information for use in authenticating a user of the wireless terminal to a wireless cellular network, (3) a second storage means storing communications code for processing information to be transferred over the wireless interface and (4) a processor arranged to execute the communications code in order to process information for communicating between the wireless terminal and the cellular network via the antenna connector.

According to another aspect, there is provided a Universal Subscriber Identity cellular Modem Module for use in a wireless electronic device and being removable therefrom. In one embodiment, the module includes: (1) an antenna connector for connecting the antenna of the wireless device to the module, (2) a memory storing user authentication information for use in authenticating a user of the wireless terminal to a UMTS cellular network and (3) a modem for communicating between the wireless device and the UMTS cellular network.

According to yet another aspect, there is provided a computer program product for operating a removable module in a wireless electronic device. In one embodiment, the program includes code which when executed by a processor performs the steps of: (1) retrieving user authentication information from a memory of the module and performing a user authentication procedure using the user authentication information to authenticate the user to a cellular network and (2) processing information to be transferred over a wireless interface, via an antenna connector of the module which connects with an antenna of the wireless device, in order to communicate between the wireless terminal and the cellular network via the antenna connector.

BRIEF DESCRIPTION

Reference is now made by way of example to the following descriptions taken in conjunction with the accompanying drawings, in which.

DETAILED DESCRIPTION

Figure 1:
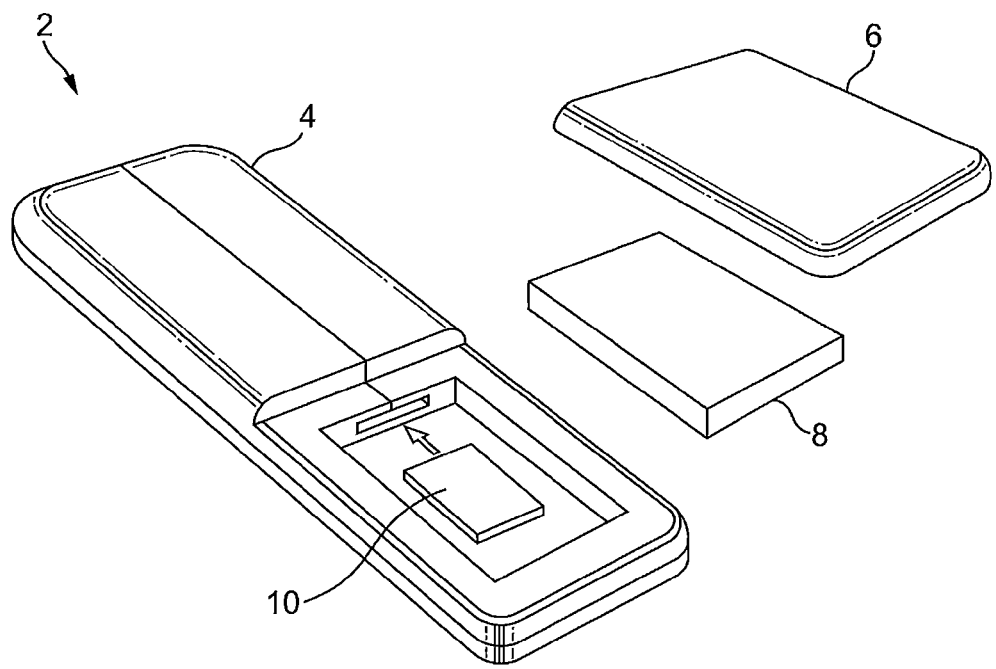
FIG. 1 illustrates an embodiment of a 'Universal Subscriber Identity cellular Modem Module' being inserted into a mobile phone or other mobile consumer device.

This disclosure relates to a removable module for a wireless device, and particularly but not exclusively to a cellular wireless wide area networking modem module that provides the function of a phone and cellular data modem. Additionally, cellular wireless wide area networking modem module may integrate a 'smartcard chip' to support the identification of a specific subscriber to a network such as a GSM or UMTS cellular network.

One embodiment disclosed herein combines, within a single self-contained module, the subscriber authentication functionality of a smart card module such as a UICC card or other SIM card with a removable modem module such as a GSM, UMTS multimode cellular modem module, to allow this module to be made specific to a single cellular subscriber on a specific cellular network service.

By adding this single self-contained module, referred to in embodiments as a 'Universal Subscriber Identity cellular Modem Module', to a wireless electronic device such as a mobile phone, will allow a cellular modem connection in combination with a cellular voice service or cellular data service to be easily provided. For example, while a user may be familiar with the procedure for replacing a SIM card or similar module, they may be reluctant to upgrade their mobile electronic device or mobile phone to handle new or different radio access technologies. The disclosed allows a user to update his phone or other wireless electronic device to handle new or different radio access technologies without having to replace it. At the same time, because radio function is incorporated into a module having the functionality as a UICC card or similar, then this can be achieved by a mechanism which is already familiar to the user. No separate UICC card or other SIM card may be required. The wireless electronic device may include a user interface.

In one embodiment, the single self-contained module may employ a communications code that includes code for performing both voice and data transfer functions. The communications code may comprise code for supporting multiple radio access standards. The multiple radio access standards comprise at least one 2G standard and at least one 3G standard. The communications code may comprise code for performing signal processing or code for performing at least one of: equalization, channel estimation, channel encoding, channel decoding, modulating, demodulating, voice codec, a RAKE receiver algorithm, a MIMO algorithm, cell measurement, and power control.

In one embodiment, the module may comprise a thermal connector for dissipating heat generated by the processor. The thermal connector may also be ground terminal. The module may comprise a plurality of signal connectors for transferring data between the module and the wireless terminal. The module may comprise a power connector for receiving power from the wireless terminal.

The module may be adapted for insertion behind a battery in a battery compartment of the wireless terminal. The module may be adapted for use in one of: a laptop computer, mobile internet device, a smart phone, a mobile phone, a personal music player, a digital camera, a games machine, and a video player. The module may have the physical dimensions 30 mm×25 mm×2 mm.

The module, in addition to providing the cellular voice and data modem function, may perform the function of a Universal Integrated Circuit Card (UICC), and may support the applications of: GSM 11.11 Subscriber Identity Module—Mobile Equipment (SIM-ME) application to allow connection to a 2G GSM cellular network; may support the 3GPP TS 31.102 Universal Subscriber Identity Module (USIM) application to allow connection to a 3G UMTS cellular network; may support the GSM 11.14 SIM Application Toolkit for the Subscriber Identity Module—Mobile Equipment; may support the 3GPP TS 31.103 IP Multimedia Services Identification Module (ISIM) application to allow identification and authentication to the 3GPP Release 5 IP Multimedia Subsystem (IMS) and to support the Session Initiation Protocol (SIP); and may in addition support other identification and authentication services as defined in the future by the 3GPP cellular standard.

In one embodiment, the module may include a first storage means that stores authentication code for performing an authentication algorithm using the user authentication information, and the processor may be arranged to execute the authentication code in order to authenticate the user to a cellular network. The first storage means may store encryption code for performing an encryption algorithm using the user authentication information, and the processor may be arranged to execute the encryption code.

The module may also include a first and second storage means comprised within the same memory unit. The first and second storage means may also be comprised in different memory units.

In one embodiment, the module may also include a processor that can be programmed as a soft baseband modem. The module may further comprise mixing circuitry configured to mix between radio frequency and baseband. The module may also further comprise at least one of: filter circuitry, amplifier circuitry configured to amplify the radio frequency signals, analogue-to-digital converter circuitry, and digital-to-analogue converter circuitry.

FIG. 1 illustrates how a 'Universal Subscriber Identity cellular Modem Module' 10 can be inserted into a mobile phone or other mobile consumer device 2. The battery cover 6 is removed from the main body 4 of the device 2, revealing the battery 8. Behind the battery 8 is a slot or recess which carries the module 10. When the battery 8 and cover 6 are replaced, the module 10 is covered helping to protect it and keep it in place. As discussed in relation to FIGS. 3 and 4, an additional mechanism may be provided for holding the module 10 in place.

Figure 2:
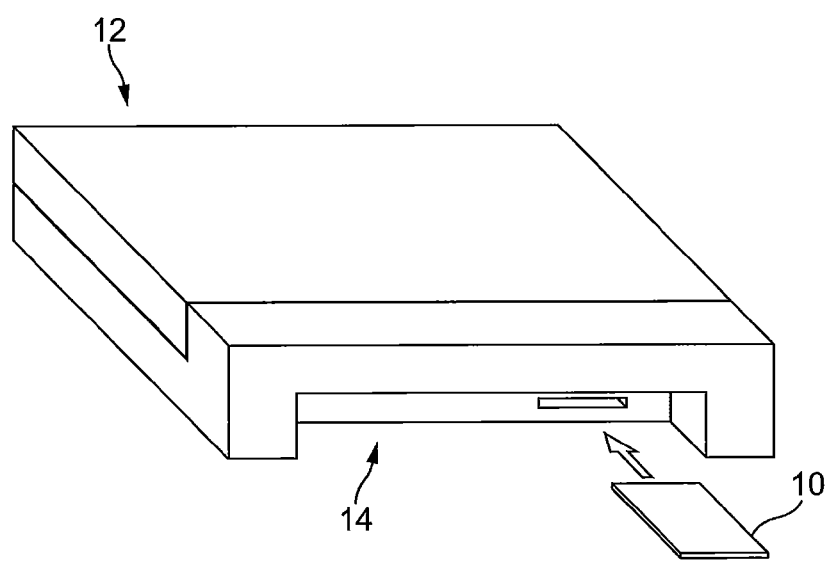
FIG. 2 illustrates an embodiment of a 'Universal Subscriber Identity cellular Modem Module' being inserted into a laptop computer.

FIG. 2 illustrates how the 'Universal Subscriber Identity cellular Modem Module' 10 may be inserted into a laptop computer 12. Here the module 10 is fitted in a slot or recess behind the battery compartment 14. When the battery and battery cover (not shown) are replaced, the module 10 is covered helping to protect it and keep it in place. Again, as discussed in relation to FIGS. 3 and 4, an additional mechanism may be provided for holding the module 10 in place.

In fact, the 'Universal Subscriber Identity cellular Modem Module' may be fitted into any one of a laptop computer, mobile internet device, a smart phone, a mobile phone, a personal music player, a digital camera, a games machine, and a video player, or practically any other user device having a suitable host connector and being equipped with a suitable wireless antenna. This advantageously allows any consumer device to be used like a mobile phone, including data and voice capabilities. The 'Universal Subscriber Identity cellular Modem Module' 10 is a user-installable module which can provide a complete cellular modem and phone function including the identification ad authentication for the provisioning of a specific cellular service to the user into any mobile device having an appropriate host connector and an appropriate wireless antenna.

Figure 3:
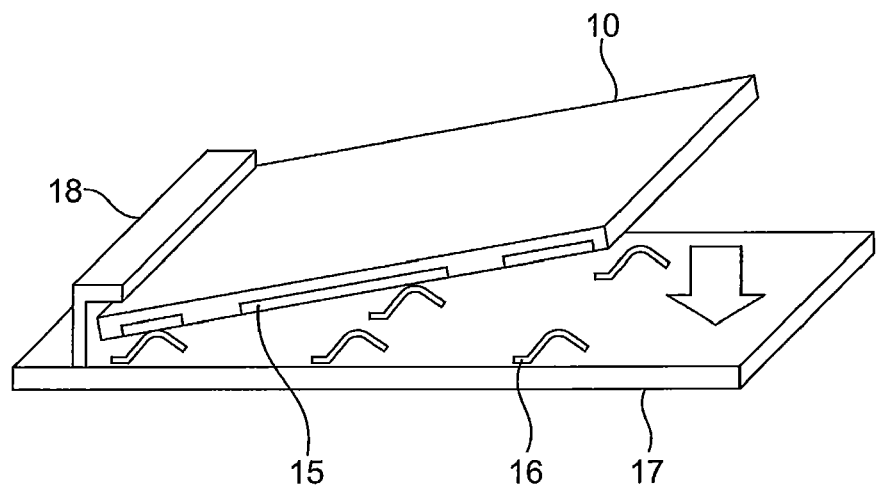
FIG. 3 illustrates an embodiment of a mechanism for clicking a 'Universal Subscriber Identity cellular Modem Module' into a user terminal.

FIG. 3 shows an embodiment of a mechanism for "clicking" the 'Universal Subscriber Identity cellular Modem Module' 10 into a host device. Here, one edge of the module 10 clips under a ledge 18 on a surface 17 of the host device, helping to keep the electrical contacts 15 of the module 10 pressed against electrical contacts 16 on the surface 17.

Figure 4:
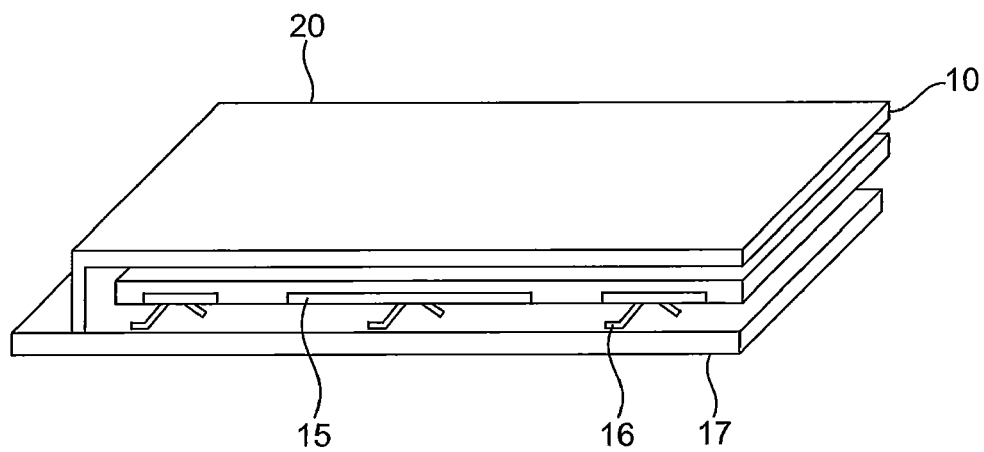
FIG. 4 illustrates an embodiment of a mechanism for slotting a 'Universal Subscriber Identity cellular Modem Module' into a user terminal.

FIG. 4 shows an embodiment of a mechanism for slotting the 'Universal Subscriber Identity cellular Modem Module' 10 into a host device. Here, the module 10 slides beneath a guiding portion 20 of the host device, which again keeps the contacts 15 of the module pressed against the contacts 16 on the surface 17 of the module 10.

Figure 5:
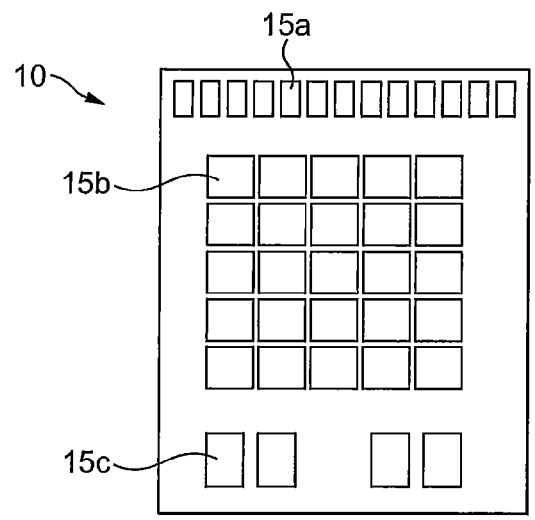
FIG. 5 illustrates an embodiment of a set of connectors on a 'Universal Subscriber Identity cellular Modem Module.

FIG. 5 illustrates an example set of electrical contacts 15 for connecting between the 'Universal Subscriber Identity cellular Modem Module' 10 and the mobile device or phone (i.e., host device) into which the module is insertable. The set of electrical contacts 15 include a row of contacts 15a which comprise both power contacts arranged to provide a power supply from the wireless terminal to the module 10, and data connectors arranged to transfer data between the module 10 and the wireless terminal. This data could comprise, for example, user input to initiate or control a call or session, audio or voice to or from the wireless terminal, or data to be uploaded or downloaded to or from the network.

The contacts also include ground connectors 15b. In one embodiment, these ground connectors 15b also act as thermal connectors which connect to a heat sink of the wireless device to dissipate heat away from the module's processor. As the processing power of such 'Universal Subscriber Identity cellular Modem Module' 10 increases, these thermal connectors will become increasingly advantageous.

Further, the connectors include antenna connectors 15c arranged to connect between the appropriate wireless antenna provided in the mobile device or phone and the 'Universal Subscriber Identity cellular Modem Module' in order to allow the module's processor to perform software radio functions as described below. Note of course that the particular arrangement shown in FIG. 5 is only by way of example, and the layout and number of these contacts is a matter of design choice.

Figure 6:
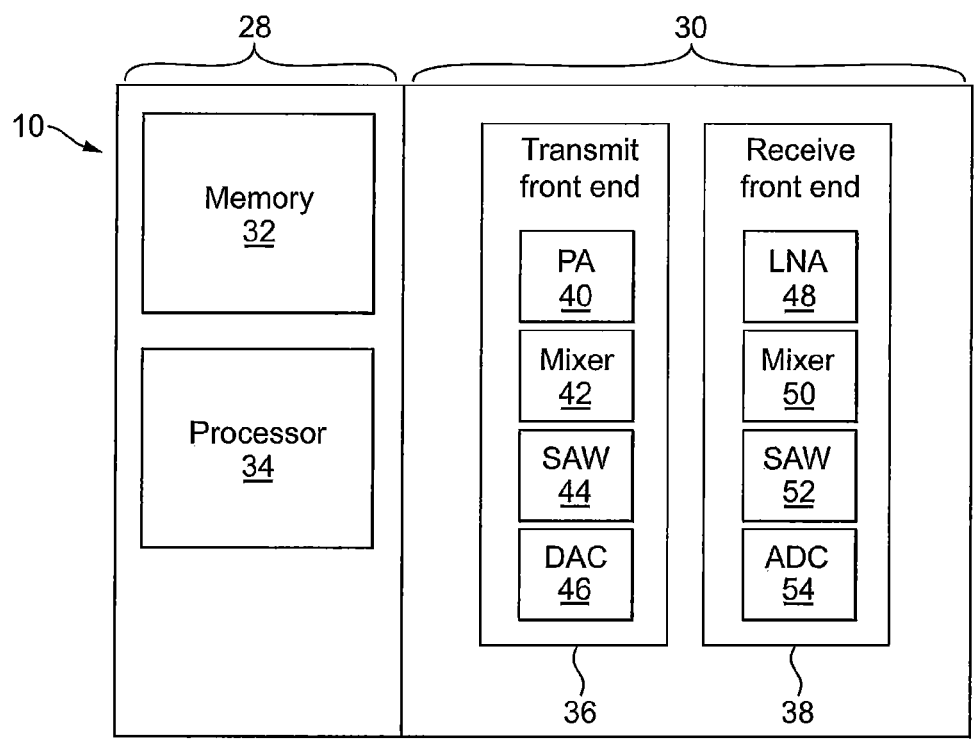
' and FIG. 6 illustrates an embodiment of an architecture of a 'Universal Subscriber Identity cellular Modem Module.'

FIG. 6 schematically illustrates an example architecture according to the invention. The 'Universal Subscriber Identity cellular Modem Module' 10 comprises a processor side 28 having a programmable processor 34 and associated memory 32, and a hardware or "system on chip" (SOC) side 30 which has dedicated hardware blocks for performing certain basic radio functions. One chip that could be used for this is Icera's Livanto® ICE8020.

The processor 34 is arranged to execute code from the memory 32 to perform the required authentication and encryption procedures for authenticating the user in the relevant cellular network. As well as performing the conventional SIM/UICC authentication and encryption, the processor 34 is also configured as a software modem, or "soft modem". The principle behind a software modem is to perform a significant portion of the signal processing required for the wireless communications in a general purpose, programmable, reconfigurable processor such as processor 34, rather than in dedicated hardware. The principles of a software modem are known to a person skilled in the art, and the skilled person will be familiar with suitable techniques which, given the disclosure of the present application, can be employed to put the invention into effect.

In one embodiment, the software modem may be a soft baseband modem. That is, on the receive side, all the radio functionality from receiving RF signals from the antenna contacts 15c up to and including mixing down to baseband may be implemented in the system-on-chip side 30. Similarly, on the transmit side, all the functionality from mixing up from baseband to outputting RF signals to the RF contacts 15c may be implemented on the SOC side 30. All functionality in the baseband domain may be implemented in software stored on the memory 32 and executed by the processor 34.

For example, shown here for illustrative purposes, the SOC side 30 comprises a receiving front end comprising a low noise amplifier (LNA) 48, a mixer 50 for mixing received RF signals to base band, a surface acoustic wave filter (SAW) 52, and an analogue to digital converter (ADC) 54; and a transmitting front-end 36 comprising a power amplifier (PA) 44, a mixer 42 for mixing baseband signals to RF signals, a SAW 44, and a digital to analogue converter (DAC) 46. Again, details of the required hardware for performing such basic radio functions will be known to a person skilled in the art.

The software modem may then handle functions such as:
Modulation and demodulation
Channel and error encoding and decoding
Equalisation and channel estimation
RAKE receiver algorithms
MIMO algorithms
Voice codecs
Cell measurements
Power control One advantage of a software modem system is that it can be programmed and potentially reprogrammed to handle different protocols and different radio access technologies. Conventionally, different radio access technologies would require different dedicated hardware to be included on a phone or other wireless terminal, and a terminal adapted to handle multiple radio access technologies would have to include different sets of dedicated hardware. This problem is solved by software modem techniques, in which the differences in communicating according to different radio access technologies are handled in software.

Accordingly, the processor 34 may be programmed to handle multiple radio access technologies, for example both 2G and 3G standards. These could include one or more of GSM, UMTS, EDGE, DigRF, HSDPA (High Speed Downlink Packet Access), and HSUPA (High Speed Uplink Packet Access).

Alternatively or additionally, the use of software modem techniques on a processor 34 of the 'Universal Subscriber Identity cellular Modem Module' 10 may allow a manufacturer, distributor or vendor to buy a batch of modules 10 then program them according to different radio standards and technologies for different customers or purposes. A module 10 could also be updated by reprogramming it to handle new or different radio access technologies.

Further, the increased use of software and reduced reliance on hardware allows the size of the module to be reduced to a suitable size for use in a UICC-type application. In a one embodiment, the 'Universal Subscriber Identity cellular Modem Module' 10 has dimensions of 30 mm by 25 mm by about 2 mm. However, other formats are also possible.

Note again that both the authentication and modem functionality of the module 10 may be incorporated into the same, self-contained module, i.e., within a single, self-contained package without the need for a separate UICC, SIM card or other smartcard module.

It will be appreciated that the above embodiments are described only by way of example. Particularly, the above has been described in relation to a 'Universal Subscriber Identity cellular Modem Module', but it will be appreciated that the principles of the disclosure can apply to other types of SIM card of smartcard module for authenticating subscribers in cellular networks according to standards other than UMTS. Further, although the authentication and modem functions have been described above as being performed by the same processor 34 and memory 32, these functions could in fact be performed using different processors and/or different memories incorporated onto the same module.

Those skilled in the art to which this application relates, therefore, will appreciate that other and further additions, deletions, substitutions and modifications may be made to the described embodiments. The scope of the invention is not limited by the described embodiments, but only by the following claims.

What is claimed is:

1. A module for use in a wireless electronic device and being removable therefrom, the module comprising:
an antenna connector for connecting the antenna of the wireless terminal to the module and transferring radio frequency signals over a wireless interface;

a first storage means storing user authentication information for use in authenticating a user of the wireless terminal to a wireless cellular network;

a second storage means storing communications code for processing information to be transferred over said wireless interface;

a processor arranged to execute said communications code in order to process information for communicating between the wireless terminal and said cellular network via said antenna connector; and a thermal connector for connecting to a heat sink of the wireless device to dissipate heat generated by said processor.

2. A module according to claim 1, wherein said communications code comprises code for performing both voice and data transfer functions.

3. A module according to claim 1, wherein said communications code comprises code for supporting multiple radio access standards.

4. A module according to claim 3, wherein said multiple radio access standards comprise at least one 2G standard and at least one 3G standard.

5. A module according to claim 1, wherein said communications code comprises code for performing signal processing.

6. A module according to claim 1, wherein said communications code comprises code for performing at least one function selected from the group consisting of:
equalisation,
channel estimation,
voice codec,
channel encoding,
channel decoding,
modulating,
demodulating,
a RAKE receiver algorithm,
a MIMO algorithm,
cell measurement, and
power control.

7. A module according to claim 1, wherein said thermal connector is also a ground terminal.

8. A module according to claim 1, comprising a plurality of signal connectors for transferring data between the module and the wireless terminal.

9. A module according to claim 1, comprising a power connector for receiving power from the wireless terminal.

10. A module according to claim 1, wherein the module is adapted for insertion behind a battery in a battery compartment of the wireless terminal.

11. A module according to claim 1, wherein the module is adapted for use in one device selected from the group consisting of:
a laptop computer,
mobile internet device,
a smart phone,
a mobile phone,
a personal music player,
a digital camera,
a games machine, and
a video player.

12. A module according to claim 1, wherein the module has the physical dimensions 30 mm×25 mm×2 mm.

13. A module according to claim 1, wherein the module is configured to perform the function of a Universal Integrated Circuit Card (UICC).

14. A module according to claim 1, wherein said user identification information comprises a service-subscriber key unique to the user and to the network operator.

15. A module according to claim 1, wherein the first storage means stores authentication code for performing an authentication algorithm using said user authentication information, and the processor is arranged to execute said authentication code in order to authenticate said user to a cellular network.

16. A module according to claim 1, wherein the first storage means stores encryption code for performing an encryption algorithm using said user authentication information, and the processor is arranged to execute said encryption code.

17. A module according to claim 1, wherein the first and second storage means are comprised within the same memory unit.

18. A module according to claim 1, wherein the first and second storage means are comprised in different memory units.

19. A module according to claim 1, wherein the processor is programmed as a soft baseband modem, and the module further comprises mixing circuitry configured to mix between radio frequency and baseband.

20. A module according to claim 1, wherein the module further comprises at least one type of circuitry selected from the group consisting of:
filter circuitry,
amplifier circuitry configured to amplify said radio frequency signals,
analogue-to-digital converter circuitry, and
digital-to-analogue converter circuitry.

21. A wireless electronic device comprising a module according to claim 1, wherein the wireless electronic device comprises a heat sink and a thermal connector for connecting the heat sink to the thermal connector of said module, the heat sink thereby being arranged for dissipating heat generated by the processor on said module.

22. A wireless electronic device according to claim 21, wherein the wireless device comprises a user interface.

* * * * *